United States Patent
Jufuku et al.

(10) Patent No.: US 8,413,751 B2
(45) Date of Patent: Apr. 9, 2013

(54) VEHICLE AND FUEL CELL VEHICLE-MOUNTING METHOD

(75) Inventors: Yasunobu Jufuku, Mishima (JP); Hiroshi Arisawa, Susono (JP); Junji Nagasawa, Numazu (JP); Hiroyuki Nakamura, Susono (JP); Miho Kizuki, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/445,158

(22) PCT Filed: Nov. 22, 2007

(86) PCT No.: PCT/JP2007/073131
§ 371 (c)(1),
(2), (4) Date: Apr. 10, 2009

(87) PCT Pub. No.: WO2008/066144
PCT Pub. Date: Jun. 5, 2008

(65) Prior Publication Data
US 2010/0044133 A1    Feb. 25, 2010

(30) Foreign Application Priority Data
Nov. 27, 2006  (JP) ................. 2006-318282

(51) Int. Cl.
*B60R 16/04*    (2006.01)
(52) U.S. Cl.
USPC .............. 180/68.5; 180/65.31; 180/312
(58) Field of Classification Search ........... 180/68.5, 180/65.31, 312
See application file for complete search history.

(56) References Cited

U.S. PATENT DOCUMENTS

| 3,736,187 | A   | * | 5/1973  | Harrison et al. ............ 429/410 |
| 5,390,754 | A   |   | 2/1995  | Masuyama et al. |
| 6,402,229 | B1  | * | 6/2002  | Suganuma .............. 296/203.02 |
| 2002/0189873 | A1 | * | 12/2002 | Mizuno ....................... 180/65.3 |
| 2004/0090085 | A1 | * | 5/2004  | Kawasaki et al. ......... 296/187.09 |
| 2005/0173170 | A1 | * | 8/2005  | Miyajima et al. ............ 180/68.5 |
| 2006/0113131 | A1 |   | 6/2006  | Kato et al. |

FOREIGN PATENT DOCUMENTS

| JP | 2002 235801 | 8/2002 |
| JP | 2002 370544 | 12/2002 |
| JP | 2003 123779 | 4/2003 |
| JP | 2003 182379 | 7/2003 |
| JP | 2003 226267 | 8/2003 |
| JP | 2004 122971 | 4/2004 |
| JP | 2004 127747 | 4/2004 |
| JP | 2004 161056 | 6/2004 |

(Continued)

*Primary Examiner* — J. Allen Shriver, II
*Assistant Examiner* — Bryan Evans
(74) *Attorney, Agent, or Firm* — Oblon, Spivak, McClelland, Maier & Neustadt, L.L.P.

(57) ABSTRACT

A vehicle is equipped with fuel cells that is fastened to multiple side frames 810 arranged in parallel to each other and along a moving direction of the vehicle. The vehicle includes a support assembly arranged to span between the multiple side frames 810, a first fixation unit arranged to fasten the support assembly to the respective side frames 810, and a second fixation unit arranged to fix the fuel cells on the support assembly. This arrangement desirably reduces the influence of an external force applied to the fuel cells mounted on the vehicle and prevents an increase in total weight of the vehicle or a decrease in mounting space of the fuel cells.

14 Claims, 7 Drawing Sheets

FOREIGN PATENT DOCUMENTS

| | | |
|---|---|---|
| JP | 2005 119598 | 5/2005 |
| JP | 2005 199952 | 7/2005 |
| JP | 2005 231549 | 9/2005 |
| JP | 2006 89040 | 4/2006 |
| JP | 2006-176013 | 7/2006 |
| JP | 2006 176105 | 7/2006 |
| JP | 2006 275218 | 10/2006 |

* cited by examiner

Support Assembly

Modified Example

VEHICLE AND FUEL CELL VEHICLE-MOUNTING METHOD

TECHNICAL FIELD

The present invention relates to a technique of mounting and fixing fuel cells on a vehicle.

BACKGROUND ART

In the case of mounting fuel cells on a vehicle, a specific structure is required to protect the fuel cells from an external force. One proposed technique keeps the fuel cells in a fuel cell casing and mounts the fuel cell casing with the fuel cells kept therein on the vehicle (see, for example, Japanese Patent Laid-Open No. 2005-231549, No. 2003-123779, and No. 2003-182379).

In order to eliminate or at least reduce the influence of an external force applied to the fuel cells, there is a demand for enhancing the rigidity or the strength of the fuel cell casing for keeping the fuel cells therein. The proposed means for satisfying such a demand include a method of using a metal material for the fuel cell casing and a method of constructing the fuel cell casing to have a thick wall. The former method, however, undesirably increases the weight of the fuel cell casing, while the latter method undesirably increases the dimensions of the fuel cell casing. The increase of the weight and the increase of the dimensions of the fuel cell casing lead to an increase in total weight of the vehicle and a decrease in mounting space of the fuel cells, respectively.

DISCLOSURE OF THE INVENTION

By taking into account the drawbacks discussed above, there would thus be a demand for providing a technique of mounting fuel cells on a vehicle in such a manner as to reduce the effect of an external force applied to the fuel cells and prevent an increase in total weight of the vehicle or a decrease in mounting space of the fuel cells.

In order to accomplish at least part of the demand mentioned above and the other relevant demands, one aspect of the invention is directed to a vehicle equipped with fuel cells that are fastened to multiple side frames arranged in parallel to each other and along a moving direction of the vehicle. The vehicle has: a support assembly arranged to span between the multiple side frames; a first fixation unit arranged to fasten the support assembly to the multiple side frames; and a second fixation unit arranged to fix the fuel cells on the support assembly.

The first fixation unit may fasten the support assembly and the respective side frames. The support assembly may consist of columnar members or plate members.

In the event of application of an external force to the vehicle, the arrangement of the vehicle according to this aspect of the invention desirably reduces the influence of the external force applied to the fuel cells, while preventing an increase in total weight of the vehicle or a decrease in mounting space of the fuel cells.

In one preferable application of the vehicle according to the above aspect of the invention, the support assembly includes multiple first members located in parallel to each other and multiple second members located in parallel to each other, the multiple first members and the multiple second members are arranged to intersect with each other and form a sharp sign shape. The first fixation unit fastens the multiple first members to the multiple side frames.

In the event of application of an external force to the vehicle and transmission of the external force to the support assembly through the side frame, the support assembly of this arrangement effectively reduces the influence of the external force.

In the vehicle of this application, it is preferable that the fuel cells are mounted at least on the multiple second members.

The fuel cells are supported by the multiple second members that are not fixed to the side frames. Even in application of an external force to the side frame, this arrangement desirably prevents the external force from being transmitted to the fuel cells.

In another preferable application of the vehicle according to the above aspect of the invention, the second fixation unit fixes the fuel cells to the support assembly at three different points.

This arrangement desirably reduces the influence of the external force to the fuel cells, while decreasing the total number of parts required for the second fixation unit.

In still another preferable application of the vehicle according to the above aspect of the invention, the second fixation unit is fastened to the support assembly and includes a mount at least partly made of an elastic material and a mount fixation member used to fix the fuel cells.

In the vehicle of this application, it is preferable that at least a specific part of the mount in contact with the support assembly is made of an insulating material.

In one preferable embodiment of the invention, the vehicle further has a fuel cell casing constructed to receive the fuel cells therein.

In the vehicle of this embodiment, it is preferable that the fuel cell casing is connected with the second fixation unit.

In the vehicle of this embodiment, it is preferable that a joint of the fuel cell casing with the second fixation unit is covered with either a rubber material or a resin material.

This arrangement desirably enhances the sealing property of the fuel cell casing, while damping the external force transmitted from the second fixation unit to the fuel cell casing.

In the vehicle of the above embodiment, it is preferable that the fuel cell casing is made of a flexible material and is linked with the support assembly.

This arrangement desirably prevents the external force from being transmitted to the fuel cell casing via the support assembly.

In another preferable application of the vehicle according to the above aspect of the invention, the first fixation unit fastens the support assembly to the respective side frames in a detachable manner.

This arrangement enables the fuel cells fastened to the support assembly to be readily detached from the vehicle for maintenance and repair of the fuel cells.

In order to accomplish at least part of the demand mentioned above and the other relevant demands, another aspect of the invention is directed to a fuel cell vehicle-mounting method adopted to fasten fuel cells on multiple side frames provided in a vehicle and arranged in parallel to each other and along a moving direction of the vehicle. The fuel cell vehicle-mounting method provides a support assembly used to support the fuel cells, arranges the support assembly to span between the multiple side frames, fastens, the support assembly and the multiple side frames, and fixes the fuel cells on the support assembly.

In the event of application of an external force to the vehicle, the fuel cell vehicle-mounting method according to this aspect of the invention desirably reduces the influence of the external force applied to the fuel cells and prevents an increase in total weight of the vehicle or a decrease in mounting space of the fuel cells.

The invention is not restricted to the vehicle having any of the various arrangements discussed above or to the fuel cell vehicle-mounting method discussed above. The technique of the invention is actualized by diversity of other applications, for example, a fuel cell in-vehicle system and a method of attaching the fuel cell in-vehicle system.

BEST MODES OF CARRYING OUT THE INVENTION

A. Embodiment
A1. General Configuration of Fuel Cell System 500 Mounted on Vehicle 1000

Figure 1:
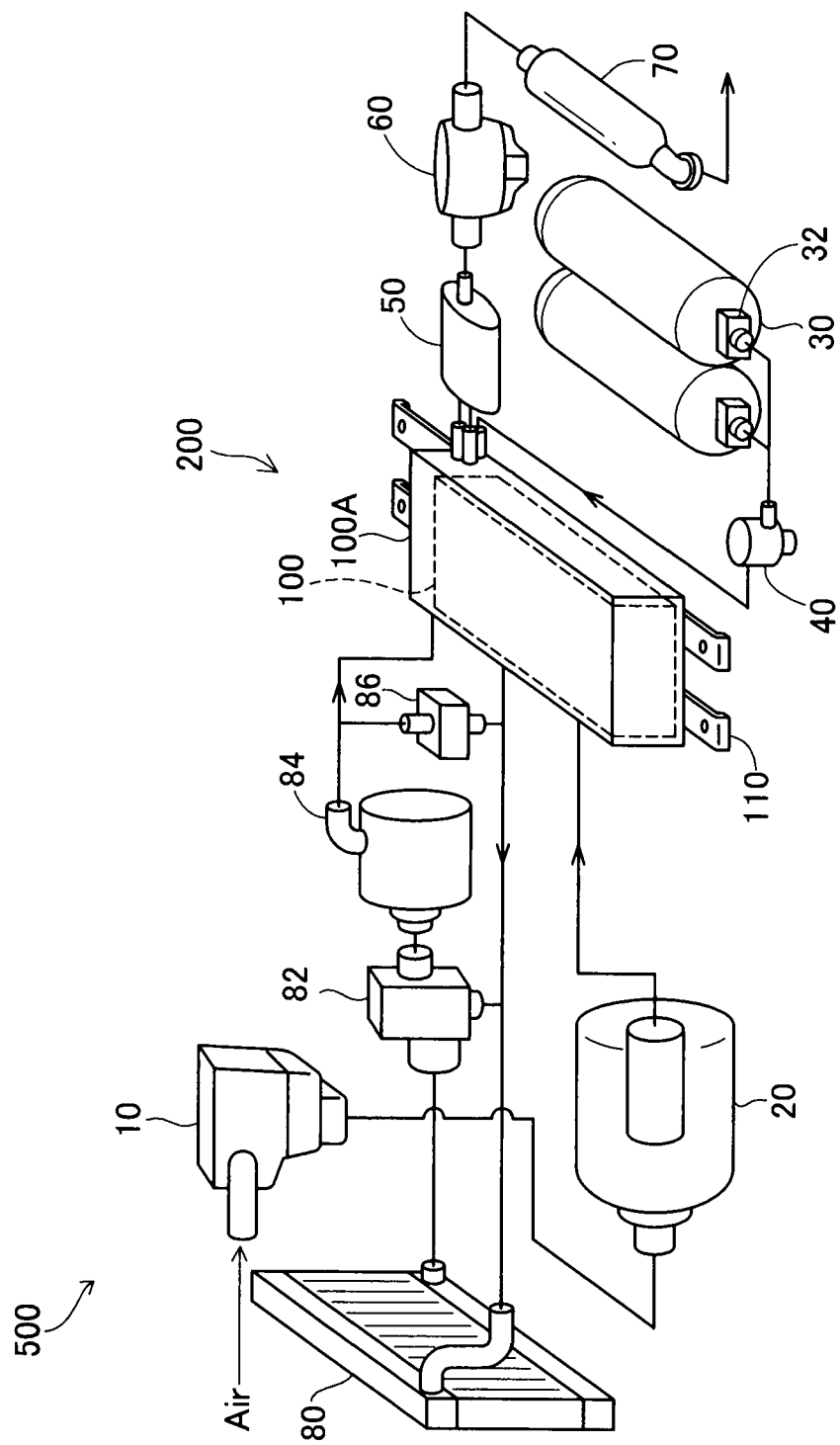
FIG. 1 schematically illustrates the configuration of a fuel cell system 500 mounted on a vehicle 1000 in one embodiment of the invention.

FIG. 1 schematically illustrates the configuration of a fuel cell system 500 mounted on a vehicle 1000 in one embodiment of the invention. As shown in FIG. 1, the fuel cell system 500 mounted on the vehicle 1000 of the embodiment includes an air cleaner 10, an air compressor 20, a hydrogen tank 30, a regulator 40, a diluter 50, a gas-liquid separator 60, a muffler 70, a radiator 80, a three-way valve 82, a cooling liquid circulation pump 84, an ion exchange unit 86, and a fuel cell vehicle-mounting system 200 including fuel cells 100. The detailed structure of the fuel cell vehicle-mounting system 200 will be described later. The fuel cells 100 are located in a fuel cell casing 100A in the fuel cell vehicle-mounting system 200.

In the fuel cell system 500 of FIG. 1, the air cleaned by removal of dust and other foreign substances in the air cleaner 10 is supplied as an oxidizing gas by the air compressor 20 to the fuel cells 100 in the fuel cell vehicle-mounting system 200. The hydrogen tank 30 is equipped with a hydrogen shutoff valve 32. In an open position of the hydrogen shutoff valve 32, a supply of hydrogen as a fuel gas is fed from the hydrogen tank 30 to the fuel cells 100. The regulator 40 is located between the hydrogen shutoff valve 32 and the fuel cells 100 to regulate (reduce) the pressure of the hydrogen supplied from the hydrogen tank 30.

Oxidizing gas exhaust and fuel gas exhaust that are not consumed in electrochemical reactions proceeding in the fuel cells 100 and are discharged are introduced into the diluter 50. The fuel gas exhaust is mixed and diluted with the oxidizing gas exhaust in the diluter 50 and is introduced as the gas mixture into the gas-liquid separator 60. The gas-liquid separator 60 liquefies and thereby separates the water content from the gas mixture. The resulting gas mixture is discharged outside via the muffler 70. The fuel cell system 500 may additionally have a device for recirculating the fuel gas exhaust into the fuel cells 100 (for example, a circulation pump). In this modified structure, the fuel gas exhaust is introduced to the diluter 50 according to the situation.

In the fuel cell system 500, the flow of a cooling liquid is circulated between the fuel cells 100 and the radiator 80 by the cooling liquid circulation pump 84. The cooling liquid is cooled down by the radiator 80 and is supplied to the fuel cells 100. The ion exchange unit 86 removes ions from the cooling liquid to reduce the electrical conductance and thereby prevent electric leakage. The cooling liquid discharged from the fuel cells 100 may be resupplied to the fuel cells 100 without going through the radiator 80 by the function of the three-way valve 82 in combination with the cooling liquid circulation pump 84.

A2. In-Vehicle Location of Fuel Cells 100

Figure 2:
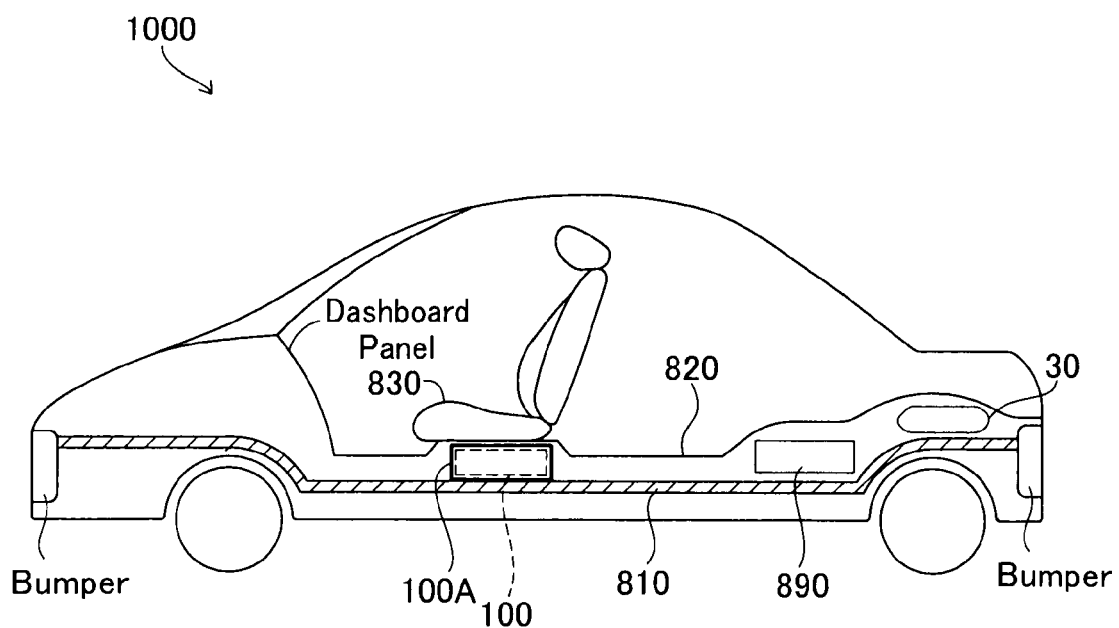
FIG. 2 schematically shows the location of fuel cells 100 on the vehicle 1000 of the embodiment.

FIG. 2 schematically shows the location of the fuel cells 100 on the vehicle 1000 of the embodiment. The vehicle 1000 illustrated in FIG. 2 is a four-wheel sedan car having a monocoque chassis construction. As the framework architecture of the vehicle 1000, a pair of side frames 810 are arranged along a vertical axis of the vehicle body, and a floor panel 820 is located above the pair of side frames 810 to form the vehicle floor. A passenger compartment is formed above the floor panel 820 as the space for a driver and other passengers. Passenger seats (including a driver seat) 830 are set in the passenger compartment. In the vehicle 1000 of the embodiment, the fuel cells 100 are mounted and installed with relevant parts of the fuel cell vehicle-mounting system 200 below the floor panel 820 under the passenger seats 830. The mounting structure of the fuel cells 100 will be discussed in detail later. The hydrogen tank 30 is located above rear wheels and below the floor panel 820 in the rear part of the vehicle 1000 as shown in FIG. 2. The vehicle 1000 is equipped with a secondary battery 890, which is omitted from the illustration of FIG. 1. The secondary battery 890 is located in a space between the fuel cells 100 and the hydrogen tank 300 below the floor panel 820 in the rear part of the vehicle 1000 as shown in FIG. 2.

A3. Fuel Cell Vehicle-Mounting System 200

Figure 3:
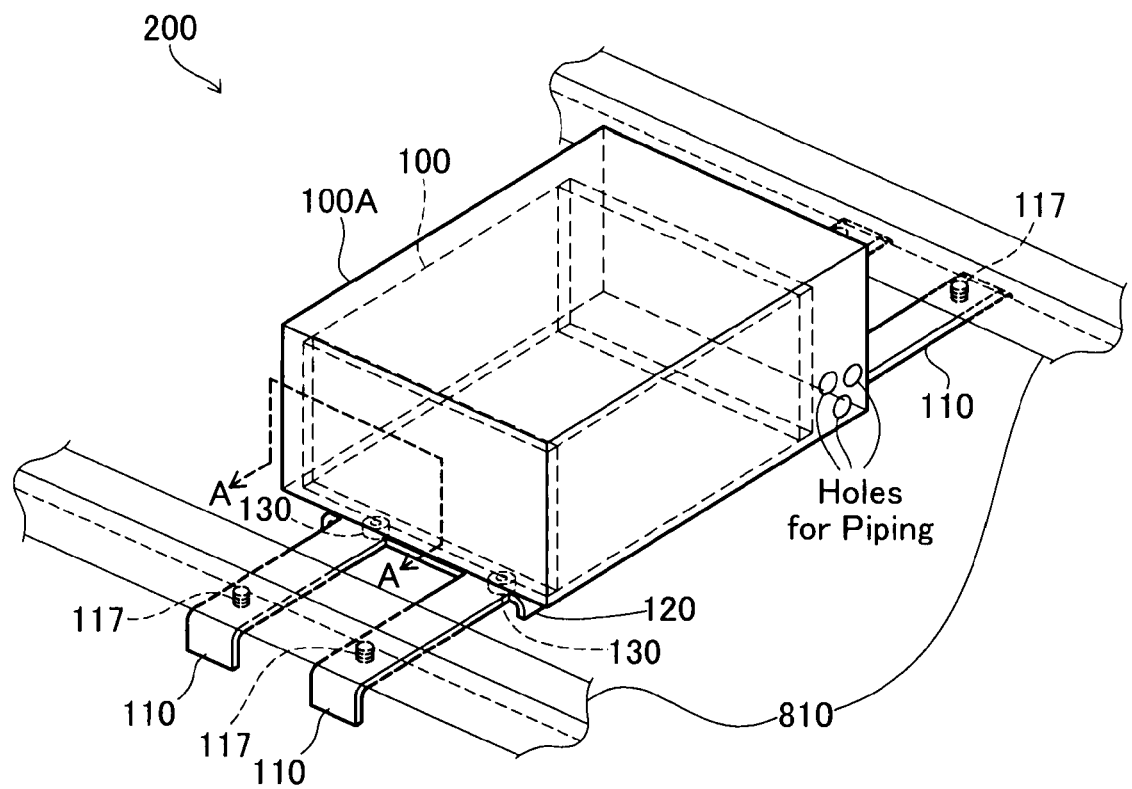
FIG. 3 shows the schematic structure of a fuel cell vehicle-mounting system 200.
Figure 4:
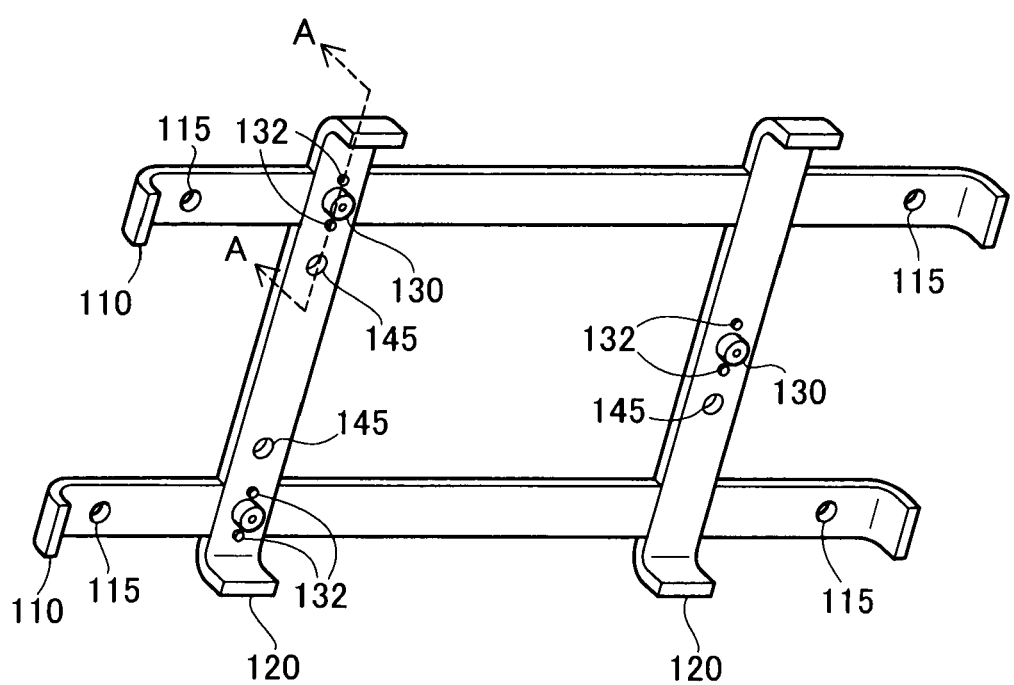
FIG. 4 shows the schematic structure of a support assembly used to support the fuel cells 100.

FIG. 3 shows the schematic structure of the fuel cell vehicle-mounting system 200. FIG. 4 shows the schematic structure of a support assembly used to support the fuel cells 100. As shown in FIGS. 3 and 4, the fuel cell vehicle-mounting system 200 mainly includes the fuel cells 100, the fuel cell casing 100A, two cross members 110 and two mount members 120 assembled as the support assembly to support the fuel cells 100, and mounts 150 attached to the fuel cells 100 to connect the support assembly with the fuel cells 100. The detailed structure of the mount 150 will be discussed later.

The cross members 110 and the mount members 120 are formed by columns of metal material (for example, iron aluminum, or stainless steel). The cross members 110 and the mount members 120 are assembled in a sharp sign shape as the support assembly as shown in FIG. 4. The mount members 120 are located in parallel to each other, and the cross members 110 are located in parallel to each other and perpendicular to and above the mount members 120.

Figure 5:
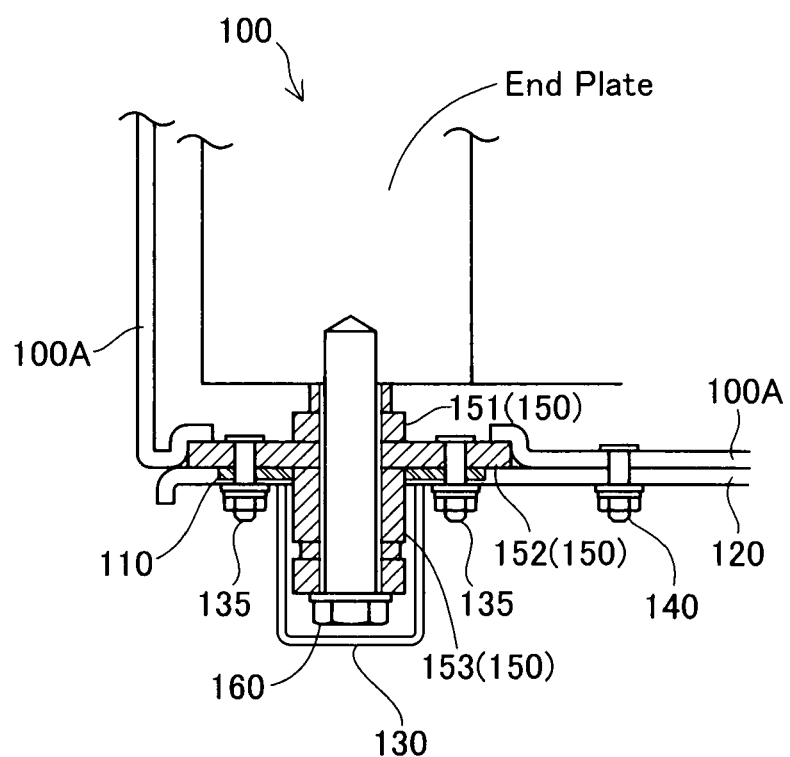
FIG. 5 is a sectional view taken on a line A-A in FIG. 3.

FIG. 5 is a sectional view taken on a line A-A in FIG. 3. The connection of the fuel cells 100 with the support assembly via the mount 150 is shown in FIG. 5. The sectional view of FIG. 5 also corresponds to an A-A cross section shown in FIG. 4. As shown in FIG. 5, the mount 150 includes a first mount member 151, a second mount member 152, and a third mount member 153. A mount bolt 160 (made of a metal material, such as aluminum or iron) is inserted through inner hollows of the respective mount members and is clamped to an end plate of the fuel cells 100, so that the mount 150 is interposed and located between the fuel cells 100 (end plate) and the support assembly. The respective members of the mount 150 are made of an insulating elastic material (for example, rubber) and a metal material and are insulated from the fuel cells 100 (end plate) and the fuel cell casing 100A.

As illustrated in FIG. 5, the first mount member 151 is interposed between the fuel cells 100 and the second mount member 152 in the mount 150. The second mount member 152 is interposed between the first mount member 151 and the support assembly (the cross member 110 and the mount member 120) and is fastened to the cross member 110 and the mount member 120 by means of nuts 135. This structure connects and fastens the fuel cells 100 to the support assembly. The third mount member 153 is connected with the second mount member 152 and supports the mount bolt 160. The second mount member 152 is also connected with the fuel cell casing 100A. The second mount member 152 and the support assembly have holes to receive the nuts 135 therein.

The fuel cell casing 100A is fastened to the mount members 120 by means of nuts 140 made of a flexible material (for example, rubber) as shown in FIG. 5. The mount members 120 have holes 145 to receive the nuts 140 therein (see FIG. 4). An insulating mount cover 130 is provided to cover over the metal head of the mount bolt 160. The mount cover 130 may be made of a metal material, as long as the mount cover 130 is away a sufficient distance from the mount bolt 160 and is kept insulated. The mount cover 130 may be integrated with the mount member 120.

The fuel cell casing 100A is made of a thin resin material and is thus relatively light in weight. The fuel cell casing 100A is insulated but is not reinforced. The fuel cell casing 100A has multiple holes for piping (see FIG. 3).

In the vehicle 1000 of the embodiment, the mounts 150 and the mount bolts 160 connect and fasten the fuel cells 100 to the support assembly at two intersections of the cross members 110 and one mount member 120 and at one point in the middle of the other mount member 120 as shown in FIG. 4.

The support assembly formed in the sharp sign shape and connected to the fuel cells 100 is fastened to the side frames 810 of the vehicle 1000. Bolts 117 provided on the side frames 810 are inserted into holes 115 formed on the respective ends of the parallel cross members 110 in the support assembly and are fastened with screws (not shown). This fixes the support assembly to the side frames 810. The support assembly is pulled down after removal of the screws to be detached from the side frames 810. The support assembly is detachable from the side frames 810 in this manner.

As described above, in the vehicle 1000 of the embodiment, the bottom face of the fuel cells 100 is held by the support assembly of the cross members 110 and the mount members 120 formed in the sharp sign shape via the mounts 150. The respective ends of the support assembly (more specifically the cross members 110) are fastened to the side frames 810. In the event of application of an external force to the vehicle 1000 and transmission of the external force to the support assembly through the side frame 810, the support assembly works to reduce the influence of the external force. The structure of the embodiment enables the external force to be escaped from one side frame 810 on the side of the force transmission source across the support assembly to the other side frame 810 and damped. This arrangement reduces the influence of the external force on the fuel cells 100 kept in the fuel cell casing 100A of the thin and light-weight structure. Namely this arrangement desirably prevents an increase in total weight of the vehicle or a decrease in mounting space of the fuel cells 100, while reducing the effect of the external force on the fuel cells 100.

The terminology 'external force' includes force generated by vertical vibrations of the vehicle, force generated by turns of the vehicle, force generated by distortional vibrations of the vehicle, force generated by acceleration and deceleration of the vehicle, and impact force generated by a collision of the vehicle.

In the vehicle 1000 of the embodiment, the support assembly is detachable from the side frames 810. This arrangement enables the fuel cells 100 fastened to the support assembly to be readily detached from the vehicle 1000 for maintenance and repair of the fuel cells 100.

In the vehicle 1000 of the embodiment, the support assembly is connected and fastened to the fuel cells 100 at the three different points by means of the mounts 150 and the mount bolts 160. This arrangement desirably reduces the total number of the mounts 150 and the mount bolts 160 and enhances the coupling force of the fuel cells 100 with the support assembly.

In the vehicle 1000 of the embodiment, the second mount members 152 of the mounts 150 fastened to the support assembly are made of the insulating elastic material. This arrangement enables the fuel cells 100 (end plate) to be insulated from the support assembly. This arrangement also damps the external force transmitted via the support assembly to the fuel cells 100 (end plate) and reduces the influence of the external force on the fuel cells 100.

In the vehicle 1000 of the embodiment, the fuel cell casing 100A is connected with the second mount members 152 of the mounts 150. This arrangement desirably enhances the sealing property of the fuel cell casing 100A.

In the vehicle 1000 of the embodiment, the fuel cell casing 100A is connected with the mount members 120 by means of the flexible nuts 140. This arrangement desirably prevents transmission of the external force through the support assembly to the fuel cell casing 100A.

The mounts 150 correspond to the mount in the claims of the invention. The cross members 110 and the mount members 120 are equivalent to the support assembly in the claims of the invention. The holes 115 and the bolts 117 are equivalent to the first fixation unit in the claims of the invention. The mounts 150 and the mount bolts 160 are equivalent to the second fixation unit or the fuel cell fixation unit in the claims of the invention. The mount bolts 160 correspond to the mount fixation member in the claims of the invention. The fuel cell casing 100A corresponds to the fuel cell casing in the claims of the invention. The nuts 140 correspond to the flexible member in the claims of the invention.

A4. Fuel Cell Vehicle-Mounting Method

The fuel cell vehicle-mounting method applied to mount the fuel cells 100 on the vehicle 1000 is described below.

Figure 6:
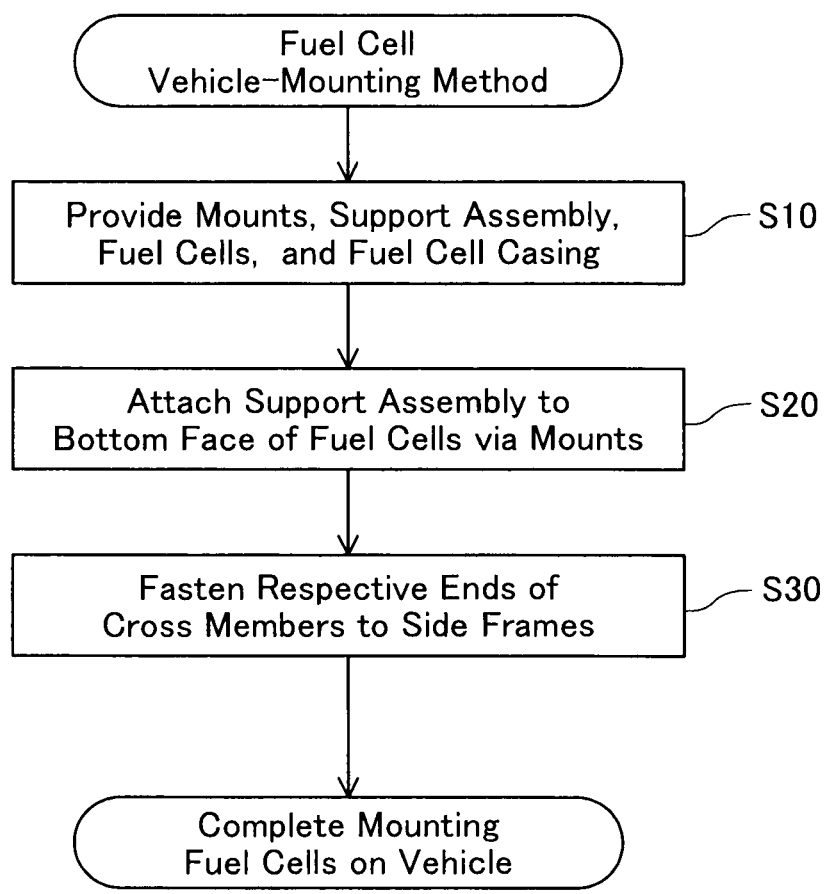
FIG. 6 is a flowchart showing a method of mounting the fuel cells 100 on the vehicle.

FIG. 6 is a flowchart showing a method of mounting the fuel cells 100 on the vehicle in the embodiment. The method first provides the fuel cells 100, the fuel cell casing 100A, the mounts 150, and the support assembly (cross members 110 and mount members 120) (step S10).

The support assembly is then attached to the bottom face of the fuel cells 100 by means of the mounts 150 (step S20) as shown in FIGS. 3 and 5. The mount covers 130 and the fuel cell casing 100A are also positioned and mounted as shown in FIGS. 3 and 5.

The respective ends of the cross members 110 in the support assembly with the fuel cells 100 mounted thereon are fastened to the side frames 810 in a detachable manner (step S30).

As described above, the fuel cell vehicle-mounting method of the embodiment fastens the respective ends of the support assembly (cross members 110) to the side frames 810, while supporting the bottom face of the fuel cells 100 via the mounts 150 on the support assembly of the cross members 110 and the mount members 120 formed in the sharp sign shape. The support assembly works to reduce the influence of the external force in the event of application of an external force to the vehicle 1000 and transmission of the external force to the support assembly through the side frame 810. The structure of the embodiment enables the external force to be escaped from one side frame 810 on the side of the force transmission source across the support assembly to the other side frame 810 and damped. This arrangement reduces the influence of the external force on the fuel cells 100 kept in the fuel cell casing 100A of the thin and light-weight structure. Namely this arrangement desirably prevents an increase in total weight of the vehicle or a decrease in mounting space of the fuel cells 100, while reducing the effect of the external force on the fuel cells 100.

B. Other Aspects

The embodiment discussed above is to be considered in all aspects as illustrative and not restrictive. There may be many modifications, changes, and alterations without departing from the scope or spirit of the main characteristics of the present invention.

B1. Modified Example 1

Figure 7:
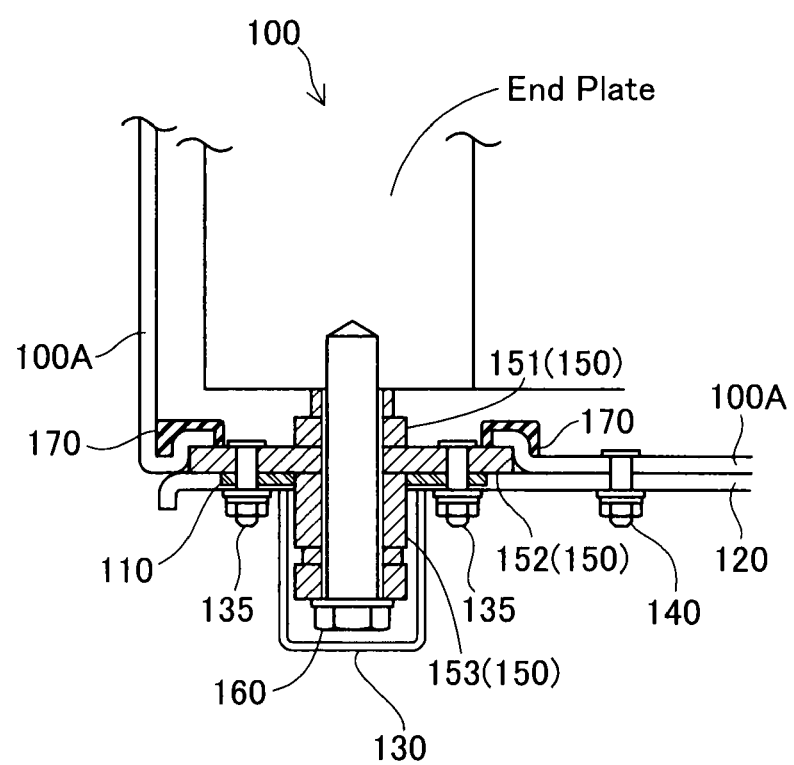
FIG. 7 is a sectional view showing a modified structure of FIG. 5.

FIG. 7 shows a modified structure of FIG. 5. In the modified structure of the fuel cell vehicle-mounting system 200 on the vehicle 1000, flexible rubber members 170 are set on the respective joints of the second mount members 152 of the mounts 150 with the fuel cell casing 100A, as shown in FIG. 7. The rubber members 170 fasten and seal the second mount members 152 to and from the fuel cell casing 100A, while damping the external force transmitted from the second mount members 152 to the fuel cell casing 100A. The material of the members 170 is not restricted to the rubber material but may be an appropriate resin material having the function of fastening and sealing the second mount members 152 to and from the fuel cell casing 100A.

B2. Modified Example 2

In the fuel cell vehicle-mounting system 200 on the vehicle 1000 of the embodiment, the support assembly used to support the fuel cells 100 is composed of the cross members 110 and the mount members 120 formed in the sharp sign shape. The invention is not restricted to this structure. The support assembly may have any structure supporting the fuel cells 100 and consisting of successive columnar members connectable with the respective side frames 810. In one modified structure, multiple cross members 110 are provided to be connected to the bottom face of the fuel cells 100 via the mounts 150. The respective ends of the multiple cross members 110 are fastened to the respective side frames 810. In the event of application of an external force to the vehicle 1000 and transmission of the external force to the support assembly through the side frame 810, the modified structure also enables the external force to be escaped from one side frame 810 on the side of the force transmission source across the support assembly to the other side frame 810 and damped. This modified arrangement reduces the influence of the external force on the fuel cells 100 kept in the fuel cell casing 100A of the thin and light-weight structure. Namely this modified arrangement desirably prevents an increase in total weight of the vehicle or a decrease in mounting space of the fuel cells 100, while reducing the effect of the external force on the fuel cells 100.

B3. Modified Example 3

In the fuel cell vehicle-mounting system 200 on the vehicle 1000 of the embodiment, the fuel cell casing 100A is made of the resin material. The resin material is, however, not essential, but the fuel cell casing 100A may be made of any material that has the insulating property and is light in weight, for example, a rubber material or a fibrous material. The use of such material for the fuel cell casing 100A does not affect the essential advantages of the structure of the embodiment.

B4. Modified Example 4

In the fuel cell vehicle-mounting system 200 on the vehicle 1000 of the embodiment, the cross members 110 and the mount members 120 are made of the columnar members. The cross members 110 and the mount members 120 may be made of hollow columnar members or flat plate members. Such modification does not affect the essential advantages of the structure of the embodiment.

B5. Modified Example 5

In the vehicle 1000 of the embodiment, the fuel cells 100 are located below the floor panel 820 under the passenger seats 830. This layout is, however, neither essential nor restrictive. In one modified structure, the floor panel 820 has a hole (not shown). The fuel cells 100 are set in the hole in such a manner that at least part of the fuel cells 100 is extended into the passenger compartment formed above the floor panel 820. Such modification does not affect the essential advantages of the structure of the embodiment.

The invention claimed is:

1. A vehicle equipped with fuel cells that are fastened to multiple side frames arranged in parallel to each other and along a moving direction of the vehicle, the vehicle comprising:
a support assembly arranged to span between the multiple side frames;
a first fixation unit arranged to fasten the support assembly to the multiple side frames; and
a second fixation unit arranged to fix the fuel cells on the support assembly,
wherein the support assembly includes multiple first members located in parallel to each other and multiple second members located in parallel to each other, the multiple first members and the multiple second members are arranged to intersect and overlap with each other,
the first fixation unit fastens the multiple first members to the multiple side frames,
the multiple first members are arranged to cross the respective side frames, and the multiple second members are arranged to be away from the respective side frames in a vehicle width direction,
the multiple first members are extended straightly between the respective side frames, and the multiple second members are extended straightly between the multiple first members, and
the second fixation unit fixes the fuel cells on the support assembly while penetrating the first members and the second members at the intersection of the first members and the second members.

2. The vehicle in accordance with claim 1, wherein the fuel cells are mounted at least on the multiple second members.

3. The vehicle in accordance with claim 1, wherein the second fixation unit fixes the fuel cells to the support assembly at three different points.

4. The vehicle in accordance with claim 1, wherein the second fixation unit is fastened to the support assembly and includes a mount at least partly made of an elastic material and a mount fixation member used to fix the fuel cells.

5. The vehicle in accordance with claim 4, wherein at least a specific part of the mount in contact with the support assembly is made of an insulating material.

6. The vehicle in accordance with claim 1, the vehicle further having:
   a fuel cell casing constructed to receive the fuel cells therein.

7. The vehicle in accordance with claim 6, wherein the fuel cell casing is connected with the second fixation unit.

8. The vehicle in accordance with claim 7, wherein a joint of the fuel cell casing with the second fixation unit is covered with either a rubber material or a resin material.

9. The vehicle in accordance with claim 6, wherein the fuel cell casing is made of a flexible material and is linked with the support assembly.

10. The vehicle in accordance with claim 1, wherein the first fixation unit fastens the support assembly to the respective side frames in a detachable manner.

11. A fuel cell vehicle-mounting method adapted to fasten fuel cells on multiple side frames provided in a vehicle and arranged in parallel to each other and along a moving direction of the vehicle, the fuel cell vehicle-mounting method comprising the steps of:
   providing a support assembly used to support the fuel cells and constructed by combination of multiple first members located in parallel to each other with multiple second members located in parallel to each other;
   arranging the support assembly to span between the multiple side frames;
   fastening the support assembly and the respective side frames; and
   fixing the fuel cells on the support assembly,
   wherein the arranging step locates the multiple first members and the multiple second members to intersect and overlap with each other, arranges the multiple first members to cross the respective side frames, arranges the multiple second members to be away from the respective side frame in a vehicle width direction, arranges the multiple first members to extend straightly between the respective side frames, arranges the multiple second members to extend straightly between the multiple first members, and fixes the fuel cells on the support assembly with a fixation unit that penetrating the first members and the second members at the intersection of the first members and the second members and
   the fastening step fastens the multiple first members to the multiple side frames.

12. The vehicle in accordance with claim 1, wherein the support assembly is configured to be detachable from the multiple side frames by pulling down after removal of the first fixation unit.

13. The vehicle in accordance with claim 1, wherein the second fixation unit fastens the fuel cells to the support assembly at two intersections of the first members and the second members and at one point in a middle portion of one of the second members.

14. The vehicle in accordance with claim 1, wherein the multiple first members are two first members in parallel to each other and the multiple second members are two second members that intersect and overlap the two first members.

* * * * *